United States Patent Office 3,505,255
Patented Apr. 7, 1970

3,505,255
POLYURETHANE PREPARED BY REACTION OF POLYISOCYANATE AND POLYETHER-POLYOL FORMED OF GLYCOL, GLUCOSIDE AND DISACCHARIDE
Camille Granger, Roland Gras, and Michel Buisson, Lavera, France, assignors to Naphtachimie, Paris, France
No Drawing. Filed July 5, 1966, Ser. No. 562,488
Claims priority, application France, July 9, 1965, 24,086
Int. Cl. C08g 22/08
U.S. Cl. 260—9     9 Claims

ABSTRACT OF THE DISCLOSURE

The preparation of polyurethane by reaction of an organic polyisocyanate with a polyether-polyhydric alcohol formed by condensation of an alkylene oxide with a mixture of glycol, glucoside, and a non-reducing disaccharide in which the glycol is present in the mixture in an amount within the range of 3–25% and the glucoside to disaccharide ratio is within the range of 0.5 to 20.

---

This invention relates to the preparation of polyurethanes from a mixture of polyhydric alcohols.

It is known to prepare polyurethanes from polyether-polyhydric alcohols and from organic polyisocyanates. As the polyether-polyhydric alcohol, use has been made of the condensation products of alkylene oxide on carbohydrates. While the carbohydrates are generally inexpensive and readily available, numerous difficulties have been experienced in their use in the manufacture of polyurethanes. The fixing of alkylene oxide onto the carbohydrate molecule is a very delicate matter because of the thermal instability.

Attempts have also been made to make use of carbohydrates in solvent solution but the solvents that are capable of being employed are difficult to eliminate. Where water is used as the solvent, it is not essential to remove the water, but the polyurethanes obtained are insufficiently cross-linked.

It is also known to convert carbohydrates into more stable compounds by the action of heat. Thus, in the production of polyurethanes, use has been made of the products of hydrogenation of carbohydrates, such as sorbitol or alkyl glucosides such as methyl glucosides. However, such polyether-polyhydric alcohols are difficult to use because of their high viscosity, and they lead to polyurethanes of low stability because they are insufficiently cross-linked.

It is an object of this invention to provide and to provide a method for producing polyurethanes from a mixture of polyhydric alcohols.

It has been found that production of polyurethanes which make use of certain mixtures of polyhydric alcohols will surprisingly avoid the many drawbacks of the type heretofore described. In accordance with the practice of this invention, polyurethanes can be prepared by a process comprising the following three steps—namely: (1) the preparation of a thermally stable mixture of polyhydric alcohols; (2) the conversion of the mixture of polyhydric alcohols into polyether-polyhydric alcohols which possess good reticulation possibilities and high fluidity for a given hydroxyl index; and (3) the preparation of improved polyurethanes based upon these polyether-polyhydric alcohols reacted with organic polyisocyanates.

In the first stage, a mixture of glycol, glucoside and non-reducing disaccharide is prepared in which the glycol content of the mixture lies within the range of about 3% to 25% and in which the ratio of glucoside to disaccharide is within the range of 0.5 to 20.

In the second stage, polyether-polyhydric alcohols are prepared by condensation of one or more alkylene oxides with the mixture of polyhydric alcohols from the first stage. The condensation is carried out under pressure and at a temperature within the range of 60–100° C. in the presence of an alkaline catalyst.

In the third stage, organic polyisocyanates are reacted with the polyether-polyhydric alcohols of the second stage or admixtures thereof with other polyhydrolyzed compounds to produce polyurethanes which may be cellular.

As the glycols, use is preferably made of monoethylene glycol, diethylene glycol, monopropylene glycol or mixtures of these glycols.

As the glucoside, use can be made of alkyl glucosides such as methyl glucoside. It is preferred to make use of glucosides of glycols such as the glucoside of monoethylene glycol, the glucoside or diethylene glycol, the glucoside of monopropylene glycol, or mixtures thereof. The glycol glucosides have the advantage of enabling polyurethanes to be prepared which are well cross-linked and almost non-inflammable.

The disaccharides are chosen from the non-reducing disaccharides, such as saccharose, trehalose, isotrehalose, or mixtures thereof.

The mixtures of dihydric alcohol, glucoside and non-reducing disaccharide can be obtained directly by the addition of the three constitutents but they may also be obtained indirectly from a monosaccharide such as glucose and from a dihydric alcohol, such as monoethylene glycol. For example, if glucose is reacted with monoethylene glycol, in accordance with the Fischer method of synthesizing glucosides, it is possible to obtain a non-reducing mixture containing essentially glycol, glucosides of glycol and non-reducing disaccharides.

Whatever the method by which they are obtained, the mixture of non-reducing polyhydric alcohols are characterized by excellent heat stability. They remain stable to temperatures in the order of 130° C., even in the presence of alkaline agents. Thus the condensation of alkylene oxides on these polyhydric alcohols can be carried out under favorable reaction conditions.

A large number of alkylene oxides can be condensed on these mixtures of polyhydric alcohols, but it is preferred to make use of ethylene oxide, propylene oxide, 1–2 butylene oxide, or a mixture of these oxides. The quantity of alkylene oxide used in the condensation reaction is generally between 10% to 90% by weight, based on the quantity of polyether-polyhydric alcohol.

To effect this condensation, use is made of an alkaline catalyst such as potash, soda, trimethylamine, or one of the alkaline phosphate or acetate salts in proportions which may be between 0.1 to 4 percent by weight of the polyhydric alcohols. The condensation of alkylene oxide with the polyhydric alcohols may be carried out under pressure in a reactor into which the oxide is introduced either intermittently in small increments or continuously The pressure in the reactor may rise to 7–8 kg./m.$^2$ during the course of the condensation reaction. The alkaline catalyst is then removed, as by neutralization with an acid, such for example as hydrochloric acid or phosphoric acid.

The polyether-polyhydric alcohols thus obtained may range from a colorless liquid to a liquid of a somewhat amber color but which may be decolorized, if desirable, by conventional methods, such as hydrogenation or treatment with oxygenated water. Their properties can be otherwise modified to a large extent depending upon the quantities of glycol, glucosides, disaccharide and alkylene oxide employed. Thus the hydroxyl indices of the polyether-polyhydric alcohols can be adjusted to any desirable value within the range of 40 to 900. The resulting polyether-polyhydric alcohols make it possible to prepare highly cross-linked polyurethanes of relatively low viscosity for a given hydroxyl index.

As the isocyanate, use can be made of any of the isocyanates currently employed, such as tolylene, di-isocyanate, diphenylmethane di-isocyanate, and polymethylenepolyphenylisocyanate.

The polyurethanes, prepared in accordance with the practice of this invention, can be processed into varnishes, resins, cellular products and the like.

In the case of the preparation of cellular polyurethanes, a swelling agent can be employed such as a halogenated hydrocarbon like trichloromonofluoromethane. It is generally desirable also to employ a surface active agent, such as a silicone oil, and a catalyst which can be selected of the tertiary amines or certain tin compound. Additions can be made of adjuvants to impart further incombustibility to the foams. The cellular polyurethanes can be obtained by different well known techniques, such as the quasi-prepolymer technique or the one stage technique, sometimes referred to as the "one shot" method. It is possible also to obtain rigid polyurethane foams of very good quality, which may be non-inflammable or self-extinguishing and which are characterized by good insulating characteristics to enable use in the building industry.

The following examples are given by way of illustration, but not by way of limitation, of the practice of this invention and in which the parts refer to parts by weight.

EXAMPLE 1

Preparation of polyether-polyhydric alcohol

A mixture of 460 parts of saccharose, 633 parts of methylglucoside, 243 parts of monoethylene glycol and 12.6 parts of potash is dissolved in an autoclave at 120° C.

3000 parts of propylene oxide are added in small increments for the condensation reaction. The temperature is maintained at 125° C. until the pressure in the autoclave approaches atmospheric pressure.

The product obtained in the autoclave is neutralized with hydrochloric acid. The water is eliminated by distillation and the product is filtered. The product obtained possesses the following characteristics—

Amber colored:
  Hydroxyl index—400
  pH value—5.6
  Viscosity at 30° C.—2,260 centistokes
  Potassium content—50 parts per million
  Water content—0.07 percent

EXAMPLE 2

Preparation of polyether-polyhydric alcohol

Under the same conditions as in Example 1, 1600 parts of propylene oxide are condensed with a mixture of 138 parts of saccharose, 554 parts of methyl glucoside, 146 parts of monoethylene glycol and 7 parts of potash.

The polyether-polyhydric alcohol obtained after neutralization with hydrochloric acid, removal of the water and filtration has the following characteristics—

Amber colored:
  Hydroxyl index—445
  pH value—5.3
  Viscosity at 30° C.—2,450 centistokes
  Potassium content—30 parts per million
  Water content—0.1 percent

EXAMPLE 3

Preparation of polyether—polyhydric alcohol

In this example, the mixture of polyhydric alcohol is prepared by the Fischer process for the synthesis of glucosides. For this purpose, a mixture of 1800 parts of glucose, 692 parts of monoethylene glycol and 31 parts of a 33% aqueous solution of hydrofluoric acid is dissolved at 95° C. in a flask fitted with a distillation column. The distillation column, used for the purpose of removing the water, is connected to a vacuum pump.

The pressure is then slowly reduced to a level of 12 to 15 mm. of mercury while the temperature is progressively raised from 95° to 105° C. At the end of 3 hours, when the water of condensation has been eliminated, a greenish product is obtained which is a mixture of monoethylene glycol, glucosides of monoethylene glycol and non-reducing disaccharides and which possesses the following characteristics:

Viscosity at 100° C.—2,394 centistokes
Free glycol content—16.2% by weight
Reducing capacity—0.8% of the reducing capacity of the glucose used In the preparation of the polyether-polyhydric alcohol, 800 parts of the product previously obtained, 6.4 parts of potash and 150 parts of propylene oxide are introduced into an autoclave. Heat is applied to maintain the materials in the autoclave at a temperature of about 120° C.

1,270 parts of additional propylene oxide are added in small increments. The temperature is maintained at 120° C. until the pressure in the autoclave approaches atmosphere. The product from the autoclave is neutralized with hydrochloric acid and the water present is removed by distillation and the product is filtered. The resulting product possesses the following characteristics—

Amber colored:
  Hydroxyl index—416
  Water content—0.11 percent
  Potassium content—0.06 percent
  Viscosity at 30° C.—7,700 centistokes

EXAMPLE 4

Manufacture of a rigid polyurethane foam

A quasi-prepolymer is first prepared containing 32% by weight of free NCO groups. For this purpose, 260 parts of the polyether-polyhydric alcohol of Example 1 and 1,000 parts of 80/20 toluene di-isocyanate are mixed at ambient temperature with stirring while in a nitrogen atmosphere. The temperature rises to about 50° C. during the course of the reaction and the product is allowed to cool to room temperature.

Into a container fitted with a stirrer, introduction is made of 150 parts of the quasi-prepolymer, 100 parts of the polyether-polyhydric alcohol of Example 1, 20 parts of trichloromonofluoromethane, 1 part silicone oil ("Rhodorsil SI 202"), 1 part water, 0.3 part dimethylethanolamine, and 0.35 part of the dibutyldilaurate of tin. As soon as foaming is observed, the product is transferred to an open mold. A foam is obtained having the following characteristics:

Specific weight—32.8 kg./m.$^3$
Relative change in volume after aging for 24 hours at 100° C.—Insignificant
Compressive strength in the direction parallel to expansion—2.28 kg./cm.$^2$

EXAMPLE 5

Manufacture of a rigid foam

First a quasi-prepolymer is prepared of the polyether-polyhydric alcohol of Example 2 in which the quasi-prepolymer contains 32% free NCO. For this purpose, 238 parts of the polyether-polyhydric alcohol of Example 2 are mixed at ambient temperature with 1,000 parts of 80/20 toluene di-isocyanate. The reaction is carried out with stirring and in a nitrogen atmosphere. The exothermic reaction raises the temperature and the mixture is allowed to cool to ordinary temperature before being employed.

With stirring, 115 parts of the quasi-prepolymer are mixed with 100 parts of the polyether-polyhydric alcohol of Example 2, 20 parts of trichloromonofluoromethane, 1 part of "Rhodorsil SI 202" silicone oil, 1 part water, 0.3 parts dimethylethanolamine and 0.35 part of dibutyl-dilaurate of tin. The product obtained is transferred to an open mold as soon as foaming is observed. The cellular product that is formed has the following characteristics:

Specific weight—31.5 kg./m.$^3$
Relative change in volume after aging for 24 hours at 100° C.—0.2 percent
Compressive strength in the direction parallel to expansion—1.96 kg./cm.$^2$

EXAMPLE 6

Manufacture of a rigid polyurethane foam

A quasi-prepolymer, containing 32% by weight of free NCO groups, is prepared in the following manner: 250 parts of the polyether-polyhydric alcohol of Example 3 and 1,000 parts of 80/20 toluene di-isocyanate are mixed at room temperature. The reaction is carried out with stirring and in a nitrogen atmosphere. During the course of the reaction, the temperature will rise to about 50° C. and the product obtained is then allowed to cool to ordinary temperature.

100 parts of the quasi-prepolymer are introduced into a container fitted with a stirrer and addition is made of a mixture composed of 100 parts of the polyether-polyhydric alcohol of Example 3, 26 parts of trichloro-monofluoromethane, 1 part of a silicone surface active agent ("Rhodorsil HS 3320") and 0.3 part of stannous 2-ethylhexoate.

When foaming is observed, the product is transferred into an open mold. A rigid foam is obtained having the following characteristics:

Specific weight—37 kg./m.$^3$
Relative change in volume after aging for 24 hours at 100° C.—2 percent
Compressive strength in the direction parallel to expansion—3.4 kg./cm.$^2$

EXAMPLE 7

(a) Preparation of a mixture of polyhydric alcohols

In this example, the mixture of polyhydric alcohols is prepared by the Fischer process for the synthesis of glucosides. For this purpose, 1,830 parts of glucose are dissolved at a temperature within the rang of 90–95° C. in a mixture containing 580 parts of monoethylene glycol and 3.6 parts of 85% commercial phosphoric acid. The solution is placed in a balloon flask fitted with a distillation column that is connected to a vacuum creating apparatus. The pressure is progressively reduced to 25–30 mm. of mercury while the temperature is progressively raised to 130° C.

When all of the water of condensation has been removed, a light chestnut colored product is obtained in the form of a mixture of monoethylene glycol, glucosides of monoethylene glycol, and non-reducing disaccharides having the following characteristics:

Viscosity at 100° C.—3,074 centistokes
Reducing capacity—0.5% of the reducing capacity of the glucose used
Free glycol content—8% by weight (b) Preparation of a polyether-polyhydric alcohol 800 parts of the prepared mixture of polyhydric alcohols and 12 parts of soda dissolved in 8 parts of water are introduced into an autoclave. 1,420 parts of 1,2-propylene oxide are introduced progressively and the temperature is maintained between 60–90° C. When the mixture of propylene oxide is completed, the temperature is held at about 90° C. until the pressure in the autoclave has become stabilized.

The product obtained is neutralized with phosphoric acid, the water is removed and the product is filtered. The polyether-polyhydric alcohol obtained possesses the following characteristics:

Color—light chestnut
Hydroxyl index—420
pH value (in a 50% solution)—5.1
Sodium content—40 parts per million percent water—0.09
Viscosity at 100° C.—70 centistokes (c) Manufacture of a rigid polyurethane foam A quasi-prepolymer containing 32% by weight of free NCO groups is first prepared in the following manner: 236 parts of the polyether-polyhydric alcohol are mixed at ordinary temperature with 1000 parts of 80/20 toluene di-isocyanate. The reaction is carried out in a nitrogen atmosphere in a receptacle fitted with an agitator. The temperature rises exothehrmically and the mixture is allowed to cool to ordinary temperature before use.

120 parts of the quasi-prepolymer, 100 parts of polyether-polyhydric alcohol prepared under (b) above, 16 parts of trichloromonofluoromethane, 1 part silicone oil, 1 part water, 0.1 part triethylenediamine and 0.5 part of dibutyl-dilaurate of tin are introduced with stirring into a container. The product is transferred to an open mold as soon as foaming is observed. The cellular product possesses the following characteristics:

Specific weight—34.4 kg./m.$^3$
Relative change in volume after ageing for 24 hours at 120° C.—Not measurable
Compressive strength in the direction parallel to expansion—2.8 kg./cm.$^2$

EXAMPLE 8

(a) Preparation of a mixture of polyhydric alcohols

In this example, use is made of a mixture of polyhydric alcohols prepared as in Example 7.

2,000 parts of glucose containing 8.5% by weight of water are dissolved in a mixture containing 650 parts of monoethylene glycol and 0.5 part of 85% commercial phosphoric acid, and solution is allowed to take place at a temperature within the range of 90–95° C. in a balloon flask fitted with a distillation column connected to a vacuum generating apparatus.

The pressure is progressively reduced to a value of 25 to 30 mm. of mercury while the temperature of the mixture is progressively raised to 130° C. When all of the water foamed and 90 parts of monoethylene glycol are removed, a light chestnut colored product is obtained comprising a mixture of monoethylene glycol, glucosides of monoethylene glycol and non-reducing disaccharides having the following characteristics:

Viscosity at 100° C.—4,700 centistokes
Reducing capacity—0.4% of the reducing capacity of the glucose used
Free glycol content—5% by weight (b) Preparation of a polyether-polyhydric alcohol 60 parts of the mixture of polyhydric alcohols obtained in (a) and 9.3 parts of soda, dissolved in 5.2 parts of water, are introduced into an autoclave. 1,100 parts of 1,2-propylene oxide are introduced progressively and the temperature of the reaction is maintained between 80–85° C. When addition of propylene oxide is completed, the temperature of the condensate is held at about 95° C. until the pressure in the autoclave has become stabilized.

The product is neutralized with phosphoric acid, water is removed and the product is filtered. The polyether-polyhydric alcohol that is obtained has the following characteristics:

Color—light chestnut
Hydroxyl index—417
pH value (in a 50% solution)—4.1
Sodium content—95 parts per million
Percent water—0.09
Viscosity at 100° C.—96.5 centistokes (c) Manufacture of a rigid polyurethane foam A quasi-prepolymer is first prepared in the following manner:

250 parts of the polyether-polyhydric alcohol are mixed at ordinary temperature with 1,000 parts of 80/20 toluene di-isocyanate. The reaction is carried out in a nitrogen atmosphere in a receptacle fitted with an agitator. The temperature rises exothermically and the mixture is allowed to cool to ordinary temperature before use.

Into a container fitted with a stirrer there is introduced 100 parts of the quasi-prepolymer, 100 parts of the polyether-polyhydric alcohol prepared under (b), 27 parts of trichloromonofluoromethane, 1.5 parts of silicone oil, 0.3 part of triethylenediamine and 0.3 part of dibutyldilaurate of tin. The product is transferred to an open mold as soon as foaming is observed.

The cellular product has the following characteristics:

Specific weight—38.3 kg./cm.$^3$
Relative change in volume after ageing for 24 hours at 120° C.—0.2 percent.
Compressive strength in the direction parallel to expansion—3.55 kg./cm.$^2$
Compressive strength in the direction perpendicular to expansion—1.84 kg./cm.$^2$ It will be apparent from the foregoing that we have provided a new and improved method and means for the production of polyurethanes from a mixture of polyhydric alcohols and that the polyurethanes are produced in high yields and in a simple and efficient manner capable of commercial practice.

It will be understood that changes may be made in the details of formulation and conditions for processing without departing from the spirit of the invention.

1. The method of preparing polyurethanes from mixtures of polyhydric alcohols comprising the steps of forming a mixture of polyhydric alcohols consisting of a glycol, a glucoside and a non-reducing disaccharide in which the glycol is present in an amount within the range of 3% to 25% by weight of the mixture and in which the weight ratio of glucoside to disaccharide is within the range of 0.5 to 20, condensing an alkylene oxide with the mixture of polyhydric alcohols under pressure at a temperature within the range of 60°–150° C. in the presence of an alkaline catalyst to produce corresponding polyether-polyhydric alcohols, neutralizing the condensation reaction product and reacting the formed polyether-polyhydric alcohols with an organic polyisocyanate to produce the polyurethane.

2. The method as claimed in claim 1 in which the glycol is selected from the group consisting of monoethylene glycol, diethylene glycol, monopropylene glyco and mixtures thereof.

3. The method as caimed in claim 1 in which the glucoside is selected from the group consisting of an alkyl glucoside, a glucoside of monoethylene glycol, a glucoside of diethylene glycol, a glucoside of monopropylene gycol, and mixtures thereof.

4. The method as claimed in claim 1 in which the non-reducing disaccharide is selected from the group consisting of a saccharose, trehalose, isotrehalose, and mixtures thereof.

5. The method as claimed in claim 1 in which the alkylene oxide is selected from the group consisting of ethylene oxide, propylene oxide, 1–2 butylene oxide, and mixtures thereof.

6. The method as claimed in claim 1 in which the proportion of alkylene oxide to polyether-polyhydric alcohol is between 10% to 90% by weight.

7. The method as claimed in claim 1 in which the isocyanate is selected from the group consisting of toluene di-isocyanate, diphenylmethanedi-isocyanate and polymethylenepolyphenylisocyanate.

8. The method of preparing polyurethanes from a mixture of polyhydric alcohols comprising the steps of forming a mixture of polyhydric alcohols consisting of a glycol selected from the group consisting of monoethylene glycol, diethylene glycol, monopropylene glycol and mixtures thereof; a gucoside selected from the group consisting of an alkyl glucoside, a glucoside of monoethylene glycol, a glucoside of diethylene glycol, a glucoside of monopropylene glycol and mixtures thereof; a non-reducing disaccharide seected from the group consisting of saccharose, trehalose, isotrehalose and mixtures thereof, in which the glycol is present within the range of 3% to 25% by weight and in which the weight ratio of glucoside to disaccharide is within the range of 0.5 to 20, condensing an alkylene oxide with the mixture of polyhydric alcohols under positive pressure and at a temperature within the range of 60° to 100° C. in the presence of an alkaline catalyst, neutralizing the condensation reaction product, and then reacting the product of the condensation reaction, after neutralization, with an organic polyisocyanate in which the alkylene oxide is selected from the group consisting of ethylene oxide, propylene oxide and 1–2 butylene oxide, and in which the organic polyisocyanate is selected from the group consisting of toluene di-isocyanate, diphenylmethanedi-isocyanate and polymethylenepolyphenylisocyanate.

9. A polyurethane produced by the method of claim 8.

References Cited
UNITED STATES PATENTS

| | | |
|---|---|---|
| 3,085,085 | 4/1963 | Wismer et al. |
| 3,167,538 | 1/1965 | Kaiser et al. |
| 3,252,925 | 5/1966 | Merten et al. _____ 260—9 |

FOREIGN PATENTS

| | | |
|---|---|---|
| 928,241 | 6/1963 | Great Britain. |

WILLIAM H. SHORT, Primary Examiner

E. M. WOODBERRY, Assistant Examiner

U.S. Cl. X.R.
260—2.5, 77.5